(12) United States Patent
Haeseler et al.

(10) Patent No.: US 6,502,385 B2
(45) Date of Patent: Jan. 7, 2003

(54) TRICOAXIAL INJECTION ELEMENT

(75) Inventors: Dietrich Haeseler, München (DE); Thomas Ruff, München (DE)

(73) Assignee: Astrium GmbH, Munich (DE)

( * ) Notice: Subject to any disclaimer, the term of this patent is extended or adjusted under 35 U.S.C. 154(b) by 0 days.

(21) Appl. No.: 09/817,499

(22) Filed: Mar. 26, 2001

(65) Prior Publication Data

US 2001/0025483 A1 Oct. 4, 2001

(30) Foreign Application Priority Data

Mar. 28, 2000 (DE) .......................... 100 15 369

(51) Int. Cl.[7] .................................. F02K 9/52
(52) U.S. Cl. .......................... 60/258; 239/424
(58) Field of Search .................. 60/258, 740; 239/424, 239/425

(56) References Cited

U.S. PATENT DOCUMENTS 4,621,492 A * 11/1986 Pragenau ............... 60/258

5,660,039 A 8/1997 Sion et al.

FOREIGN PATENT DOCUMENTS

| DE | 2644607 | * | 4/1978 |
| EP | 0 924 424 | | 6/1999 |

* cited by examiner

Primary Examiner—Michael Koczo
(74) Attorney, Agent, or Firm—Kenyon & Kenyon

(57) ABSTRACT

An injection element for a combustion component running on two propellants, includes a first, central injection channel, which is connectable to a first propellant supply for a first propellant, and a second injection channel, which annularly surrounds the first injection channel. The second injection channel is connectable to a second propellant supply for a second propellant. The injection element includes a third injection channel, which annularly surrounds the second injection channel and which is in fluid communication with the first injection channel.

20 Claims, 1 Drawing Sheet

TRICOAXIAL INJECTION ELEMENT

FIELD OF THE INVENTION

The present invention relates to an injection element for a combustion component that runs on two propellants, having a first, central injection channel which can be connected to a first propellant supply for a first propellant, and having a second injection channel which annularly surrounds the first injection channel, and can be connected to a second propellant supply for a second propellant.

BACKGROUND INFORMATION

An injection element for a combustion component running on two propellants is described, for example, in U.S. Pat. No. 5,660,039. The injection element includes a first, central injection channel, which can be connected to a first propellant supply for a first propellant, and a second injection channel, which annularly surrounds the first injection channel and which can be connected to a second propellant supply for a second propellant. The injection element is a bicoaxial injection element, a tricoaxial injection system being formed after installing the injection element in an injection nozzle, through a space, which is between an injection wall that acts as a front panel and the injection element. Therefore, there is no rigid connection between the faceplate and the injection element.

However, such a system can, at best, be used in small combustion chambers, e.g., gas generators, where it is not absolutely necessary to reinforce the faceplate. In the case of larger combustion chambers, such as main combustion chambers of rocket engines, the entire surface of the faceplate must be reinforced.

Therefore, one object of the present invention is to provide an injection element, as well as an injection head, which have a high mechanical stability, allow effective combustion, and can be used universally.

SUMMARY

The present invention provides an injection element, which, in contrast to the bicoaxial injection elements described above, is in the form of a tricoaxial injection element. This arrangement provides an injection element having three propellant streams, all three of which are arranged coaxially. The injection element is designed to be used in a combustion component, such as a rocket combustion chamber, which runs on two propellants (both of which can be liquid, gaseous, or a gas-liquid mixture). The injection element has a first, central injection channel, which can be connected to a first propellant supply for a first propellant, and a second injection channel, which annularly surrounds the first injection channel and which can be connected to a second propellant supply for a second propellant.

The present invention provides for the injection element having a third propellant channel, which annularly surrounds the second propellant channel and which is in fluid communication with the first injection channel. Therefore, the injection element includes a tricoaxial design.

This arrangement allows previously utilized injection-head designs to be used or retained for this injection element having three propellant streams, whereby the use of the injection element is considerably simplified. The injection head does not have to be specially adapted. In addition, these injection elements allow the faceplate to be fastened to the injection-head base plate, since no gaps must remain between the faceplate and the injection element. All three propellant streams are formed inside the injection element so that the number of elements can be easily scaled to the respective application. Dividing up the first propellant into two streams, through the central injection channel, and through the external, annular injection channel inside the injection element, improves the control and testability of an individual injection element. In addition, this arrangement considerably reduces the accuracy requirements for the faceplate. The geometrical accuracy required for the injection system to function may be more easily produced for the component parts of the injection element.

In addition to all these advantages of the present invention, it is ensured that the injection elements may be operated at a high mass flowrate per injection element, in order to reduce the number of injection elements, and therefore, to reduce the costs of manufacturing and installation, as well as integration. Furthermore, the tricoaxial injection ensures an improved propellant atomization, since two parallel shear surfaces are produced between the injected propellant streams, between the central stream and the internal annular stream, as well as between the internal and external annular streams.

In one embodiment of the present invention, the third injection channel is connected to the first injection channel via flow channels. These flow channels allow the division of the propellant streams between the third injection channel and the central, first injection channel, to be controlled by the number and size of the injection channels, which can be matched to the pressure difference between the first and third injection channels. The division of the propellant streams may also be subsequently modified by adding additional flow channels or by closing flow channels.

In particular, the flow channels may be embedded in connecting elements, which penetrate the second injection channel. Thus, the connecting elements may, for example, be in the form of cross-pieces, which subdivide the annular, second injection channel into several annular sectors, at least over a segment of its length, in the flow direction of the second propellant.

The flow channels may have different shapes and may extend to the first injection channel in different ways. The flow channels may extend radially to the longitudinal extension of the first injection channel, in the direction of the first injection channel, which, generally represents the shortest possible connection to the first injection channel. However, the flow channels may also extend at an angle to the flow direction of the second propellant, inclined in the direction of the first injection channel, in order to divert the flow in an improved manner, upon the flow channels entering the first injection channel in the downstream direction of the first injection channel.

A different arrangement of the flow channels may also be provided in the radial planes. Thus, the flow channels may form an angle other than zero with the radial direction, in a plane radial to the longitudinal extension of the first injection channel. In this manner, the propellant stream receives a rotational component upon entering the first injection channel. This measure may also be combined with one of the above-mentioned measures.

In another embodiment of the present invention, the third injection channel is connectable to the first propellant supply, and the first injection channel is connectable to the first propellant supply via the hydraulic connection to the third injection channel. Therefore, it is not necessary to have a separate propellant supply to the first injection channel.

Rather, this is accomplished simultaneously by the hydraulically controlled connection, in particular, by the flow channels.

In addition, the second injection channel may be widened in the region of the downstream opening. This arrangement may improve the mixing of the second propellant with the adjoining streams of the first propellant.

The injection elements may include a sleeve, which surrounds the injection channels and, downstream from the injection channels, forms an annularly enclosed space into which the injection channels open. Therefore, an improved mixing of the propellants may be attained before the propellants enter into the actual reaction chamber, it being possible to adjust the mixing to corresponding requirements for it by varying the sleeve geometry, especially the size of the enclosed space.

The entire injection element may be constructed from relatively few individual elements. Thus, the injection element may be formed by a first, upstream element, a second downstream element, as well as the sleeve, which at least partially encircles the first and second elements, the first and second injection channels being formed in the first and second elements, and the third injection channel being formed between the second element and the sleeve. The individual elements are interconnected in a suitable manner. In particular, the first element is joined to the second element by a welded connection, soldered connection, or clamped connection. The sleeve may be joined to the first element and/or to the second element by a welded connection, soldered connection, or screw connection.

The individual elements and/or the sleeve may be manufactured by turning, milling, precision casting, or powder metallurgy, and the flow channels may be produced by erosive machining or boring, especially using electron-beam drilling or laser drilling.

The present invention includes an injection head, which has at least one above-described injection element. In addition, the injection head has a base plate positioned upstream and a faceplate positioned downstream, one side of the injection element being rigidly connected to the base plate, and the other side of the injection element being rigidly connected to the faceplate. Thus, a rigid connection between the faceplate and the base plate is ensured with the aid of the injection elements. This connection may also be designed in a suitable manner. In particular, the connection may be in the form of a screw connection, welded connection, or soldered connection.

DETAILED DESCRIPTION

Figure 1:
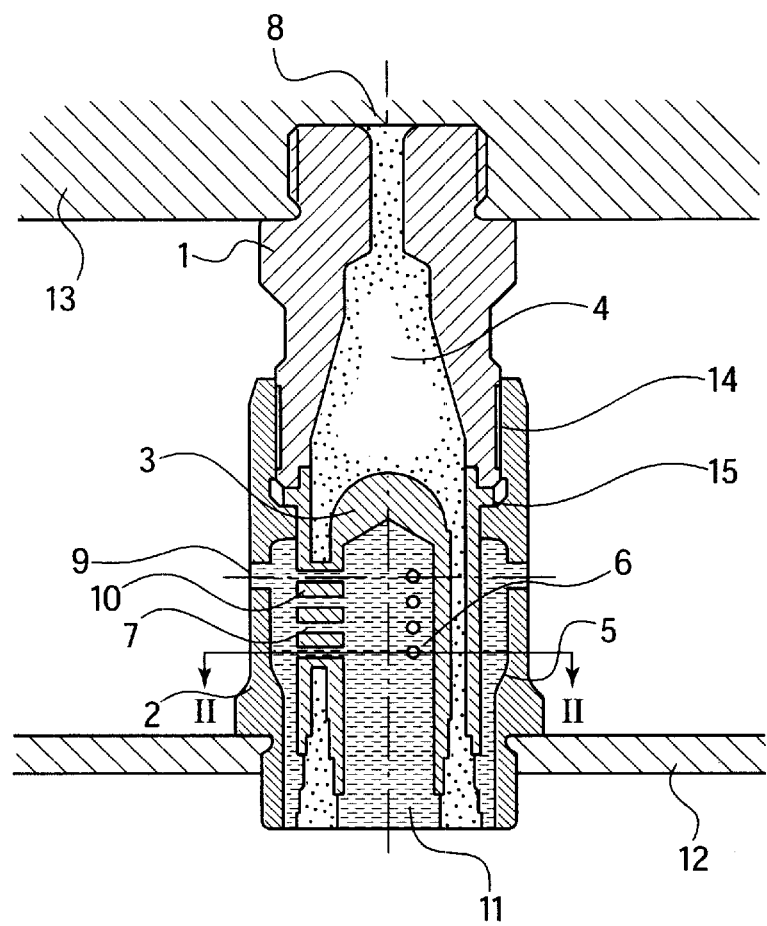
FIG. 1 is a cross-sectional side view of an injection element according to the present invention.

The injection element according to FIG. 1 includes three individual elements, namely a first element 1 which is arranged upstream, a second element 3 which is arranged downstream, and a sleeve 2 which completely encircles second element 3, and partially encircles first element 1. Such an injection element may be machined inexpensively and almost entirely by conventional machining methods.

Second element 3 has a central borehole 6, which forms a first, central injection channel. In addition, second element 3 has an annular opening forming the downstream section of a second injection channel 4, which annularly surrounds first injection channel 6. This annular opening that forms the downstream section of the second injection channel 4 becomes wider at its downstream end. The upstream section of second injection channel 4 is formed by a single borehole, which axially extends from above, into first element 1, and at the transition to the second element, it expands to the outer diameter of the annular opening. This borehole may have an aperture for determining the mass flow flowrate. This borehole may be positioned to have the same axis as the subsequent, annular opening. In addition, the borehole can be connected to a propellant supply 8 for a second propellant.

For example, first element 1 is screwed into sleeve 2 by a thread 14, whereby first element 1 is simultaneously clamped against second element 3, which, as illustrated in FIG. 1, is arranged so as to be form-locked in sleeve 2, and is prevented from sliding downstream out of sleeve 2, by corresponding projections 15. Sleeve 2 extends downstream, beyond second element 3, and thus forms an annularly enclosed space 11, into which injection channels 4 and 6 open. Therefore, the propellants are intermixed for the first time in a defined space 11.

Figure 2:
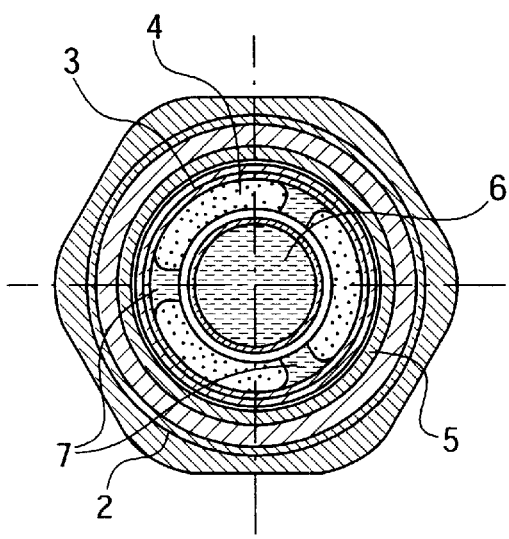
FIG. 2 is a radial cross-section of the injection element taken along the line II—II of FIG. 1.

Formed between sleeve 2 and second element 3 is an additional, annular opening 5, which acts as a third injection channel, and also opens into space 11. This annular opening is hydraulically connected to first injection channel 6 via radial flow channels 7, a plurality of radial bores being provided as flow channels 7 that are disposed in radial cross-pieces 10, which penetrate second injection channel 4 in a subsection of its longitudinal extension, thereby subdividing it into a plurality of annular sectors. The shape and arrangement of these annular sectors may be selected so that the propellant is homogeneously distributed along the periphery, in the annular opening. A special arrangement and form design are illustrated in the cross-sectional view shown in FIG. 2. In particular, the annular sectors and the flow channels may be produced by milling, wire-erosion machining, or electron-beam drilling. On the other side, third injection channel 5 has a radial opening, which may be connected to a propellant supply 9 for a first propellant.

Also illustrated in FIG. 1 are injection-head base plate 13 and a faceplate 12, to which the injection element is rigidly connected, e.g., by screwing it into base plate 13 and bolting it to faceplate 12.

The following briefly explains the function of the injection element. The second propellant enters axially from above, through the borehole, into first element 1. It circumflows the central section of second element 3, passes through the internal annular opening that is a part of second injection channel 4, and finally arrives in annularly enclosed space 11. From outside, the first propellant passes laterally through one or more boreholes in sleeve 2, into external, third injection channel 5. A certain portion of the first propellant passes through injection channel 5, and travels downstream into space 11. From third injection channel 5, the remaining portion of the propellant passes laterally through flow channels 7, into central injection channel 6 in second element 3, from which it is likewise directed further into space 11. Finally, the propellants are intermixed for the first time in space 11, the intermixing being promoted by the tricoaxial arrangement, and also by the widening of second injection channel 4 in the area of space 11.

What is claimed is:

1. An injection element for a combustion component running on two propellants, comprising:

a first, central injection channel connectable to a first propellant supply for a first propellant;

a second injection channel annularly surrounding the first injection channel and being connectable to a second propellant supply for a second propellant, wherein the second injection channel widens in a region of a downstream opening; and a third injection channel annularly surrounding the second injection channel and being hydraulically connected to the first injection channel.

2. An injection element for a combustion component running on two propellants, comprising:

a first, central injection channel connectable to a first propellant supply for a first propellant;

a second injection channel annularly surrounding the first injection channel and being connectable to a second propellant supply for a second propellant; and a third injection channel annularly surrounding the second injection channel and being hydraulically connected to the first injection channel;

a first upstream element;

a second downstream element; and a sleeve, the sleeve at least partially encircling the first upstream element and the second downstream element, the first injection channel being formed in the second downstream element, the second injection channel being formed in the first upstream element and the second downstream element, the third injection channel being formed between the second downstream element and the sleeve.

3. The injection element according to claim 2, wherein the first upstream element and the second downstream element are joined by one of a welded connection, a soldered connection and a clamped connection.

4. The injection element according to claim 2, wherein the sleeve is joined to at least one of the first upstream element and the second downstream element by one of a welded connection, a soldered connection and a screw connection.

5. The injection element according to claim 2, wherein at least one of the first upstream element, the second downstream element and the sleeve is manufactured by one of turning, milling, precision casting and power metallurgy.

6. An injection head, comprising:

at least one injection element including:
    a first, central injection channel connectable to a first propellant supply for a first propellant;
    a second injection channel annularly surrounding the first injection channel and being connectable to a second propellant supply for a second propellant; and
    a third injection channel annularly surrounding the second injection channel and being hydraulically connected to the first injection channel;

a base plate disposed upstream; and a faceplate disposed downstream;

wherein the at least one injection element is rigidly connected to the base plate and the at least one injection element is rigidly connected to the faceplate.

7. The injection head according to claim 6, wherein the third injection channel is connected to the first injection channel via at least one flow channel.

8. The injection head according to claim 7, wherein the at least one injection element further includes a plurality of connecting elements penetrating the second injection channel, the at least one flow channel being embedded in the connecting elements.

9. The injection head according to claim 8, wherein the connecting elements define cross-pieces, which subdivide the annular, second injection channel into several annular sectors at least over a segment of a length thereof in a flow direction of the second fuel.

10. The injection head according to claim 7, wherein the at least one flow channel extends radially to a longitudinal extension of the first injection channel and in a direction of the first injection channel.

11. The injection head according to claim 7, wherein the at least one flow channel extends at an angle to a flow direction of the second propellant and toward the first injection channel.

12. The injection head according to claim 7, wherein, relative to a plane radial to a longitudinal extension of the first injection channel, the at least one flow channel forms an angle other than zero.

13. The injection head according to claim 6, wherein the third injection channel is connectable to the first propellant supply and the first injection channel is connectable to the first propellant supply via the hydraulic connection between the first injection channel and the third injection channel.

14. The injection head according to claim 6, further comprising a sleeve surrounding each of the first injection channel, the second injection channel and the third injection channel, the sleeve forming an annularly enclosed space disposed downstream from the first injection channel, the second injection channel and the third injection channel, the first injection channel, the second injection channel and the third injection channel opening into the annularly enclosed space.

15. The injection head according to claim 6, wherein the at least one injection element further includes a first upstream element, a second downstream element and a sleeve, the sleeve at least partially encircling the first upstream element and the second downstream element, the first injection channel being formed in the second downstream element, the second injection channel being formed in the first upstream element and the second downstream element, the third injection channel being formed between the second downstream element and the sleeve.

16. The injection head according to claim 15, wherein the first upstream element and the second downstream element are joined by one of a welded connection, a soldered connection and a clamped connection.

17. The injection head according to claim 15, wherein the sleeve is joined to at least one of the first upstream element and the second downstream element by one of a welded connection, a soldered connection and a screw connection.

18. The injection head according to claim 6, wherein the connection between the at least one injection element and the base plate and the connection between the at least one injection element and the faceplate includes one of a screw connection, a welded connection and a soldered connection.

19. An injection head comprising:

at least one injection element including:
    a first, central injection channel connectable to a first propellant supply for a first propellant;
    a second injection channel annularly surrounding the first injection channel and being connectable to a second propellant supply for a second propellant, wherein the second injection channel widens in a region of a downstream opening; and
    a third injection channel annularly surrounding the second injection channel and being hydraulically connected to the first injection channel;

a base plate disposed upstream; and a faceplate disposed downstream;

wherein the at least one injection element is rigidly connected to the base plate and the at least one injection element is rigidly connected to the faceplate.

20. An injection head, comprising:
at least one injection element including:
- a first, central injection channel configured to connect to a supply of a first one of two propellants;
- a second injection channel annularly surrounding the first injection channel and configured to connect to a supply of a second one of the two propellants; and
- a third injection channel annularly surrounding the second injection channel and hydraulically connected to the first injection channel;

a base plate disposed upstream; and
a faceplate disposed downstream;
wherein the at least one injection element is rigidly connected to the base plate and the at least one injection element is rigidly connected to the faceplate.

* * * * *